(12) United States Patent
Florence et al.

(10) Patent No.: US 7,710,699 B2
(45) Date of Patent: May 4, 2010

(54) CURRENT LIMITATION IN AN INDUCTANCE WITH A LIMIT CURRENT ADAPTATION

(75) Inventors: Arnaud Florence, Saint Antoine du Rocher (FR); Jérome Heurtier, Tours (FR); Franck Galtie, Veretz (FR)

(73) Assignee: STMicroelectronics SA, Montrouge (FR)

( * ) Notice: Subject to any disclaimer, the term of this patent is extended or adjusted under 35 U.S.C. 154(b) by 281 days.

(21) Appl. No.: 11/014,520

(22) Filed: Dec. 14, 2004

(65) Prior Publication Data

US 2005/0135128 A1 Jun. 23, 2005

(30) Foreign Application Priority Data

Dec. 16, 2003 (FR) .................................. 03 51072

(51) Int. Cl.
*H02H 3/08* (2006.01)
(52) U.S. Cl. ....................... 361/93.1; 361/87
(58) Field of Classification Search ................. 361/93.1, 361/87
See application file for complete search history.

(56) References Cited

U.S. PATENT DOCUMENTS

| 5,130,582 | A  | * | 7/1992 | Ishihara et al. | ............... 327/262 |
| 5,731,735 | A  | * | 3/1998 | Yokota et al. | ................ 327/535 |
| 6,487,097 | B2 | * | 11/2002 | Popescu | ................... 363/56.09 |
| 6,624,679 | B2 | * | 9/2003 | Tomaiuolo et al. | .......... 327/262 |
| 2005/0184787 | A1 | * | 8/2005 | Tomita | ........................ 327/277 |

FOREIGN PATENT DOCUMENTS

| FR | 2835115 | 7/2003 |
| JP | 62152367 | 7/1987 |
| JP | 6327239 | 11/1994 |
| JP | 2003274647 | 9/2003 |

OTHER PUBLICATIONS

French Search Report, FR0351072, Aug. 4, 2004.

* cited by examiner

*Primary Examiner*—Ronald W Leja
*Assistant Examiner*—Christopher J Clark
(74) *Attorney, Agent, or Firm*—Lisa K. Jorgensen; Paul F. Rusyn; Graybeal Jackson LLP

(57) ABSTRACT

A method and a circuit for limiting the current in an inductance, comprising means for interrupting the power storage in the inductance at the end of a delay triggered by the current in the inductance.

29 Claims, 3 Drawing Sheets

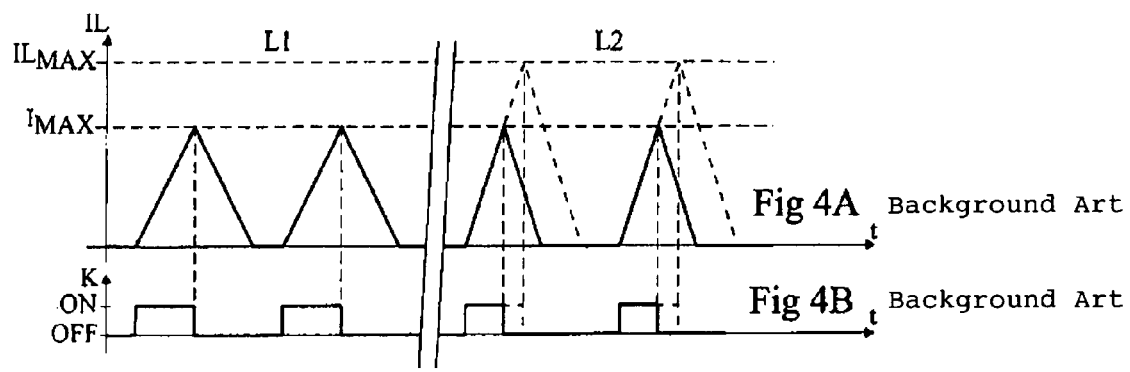
Fig 4A Background Art
Fig 4B Background Art
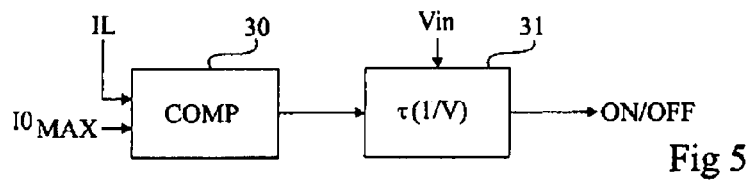
Fig 5
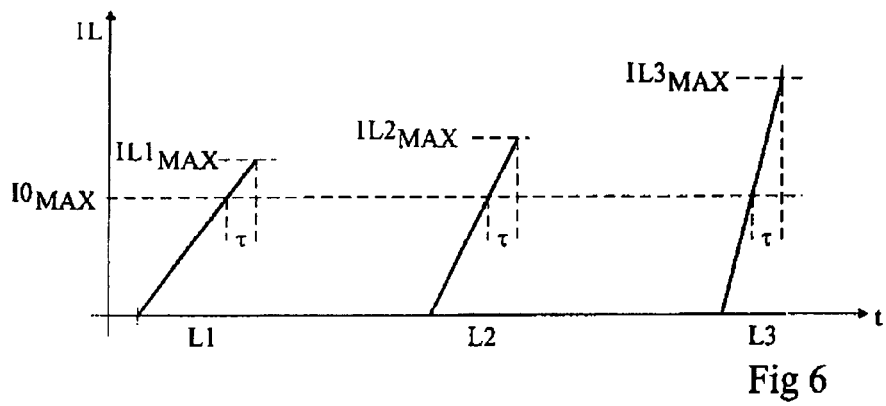
Fig 6
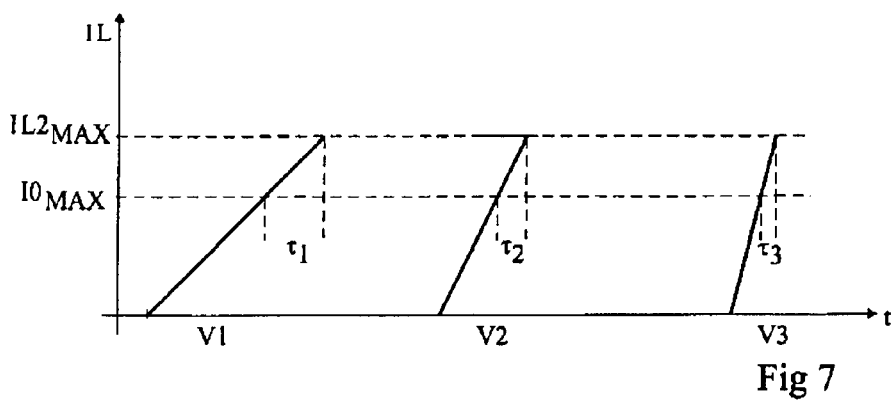
Fig 7

US 7,710,699 B2

CURRENT LIMITATION IN AN INDUCTANCE WITH A LIMIT CURRENT ADAPTATION

PRIORITY CLAIM

This application claims priority from French patent application No. 03/51072, filed Dec. 16, 2003, which is incorporated herein by reference.

BACKGROUND OF THE INVENTION

1. Field of the Invention

Embodiments of the present invention relate to the field of circuits for protecting an inductance so that the current flowing through it does not exceed its saturation current, and relate to any system in which the current is desired to be limited in an inductance. An example application for embodiments of the present invention is the field of power converters (step-up or step-down) in which a switch controlling the current in an inductance is controlled by a train of pulses, for example, modulated in width (PWM), in frequency (FWM), etc.

2. Discussion of the Related Art

FIG. 1 very schematically shows a conventional example of a step-up converter.

Such a converter uses an inductance L in series with a diode D between a terminal 1 for applying a D.C. input voltage Vin and a terminal 2 for applying an output voltage Vout for a load 3 (Q). A capacitor Cout for storing voltage Vout is connected between terminal 2 and ground M. Further, a switch K (for example, a MOS transistor) connects the anode of diode D (unction point of the inductance and of the diode) to ground. Switch K is controlled by a width-modulated pulse train to control the output voltage based upon the needs of the load or a predetermined value. The operation of such a converter is known. When switch K is on, a current flows through inductance L from voltage source Vin (for example, a battery) while capacitor Cout supplies load 3. When switch K turns off, the power stored in inductance L recharges capacitor Cout at the same time as it supplies the load.

To protect inductance L against a deterioration, it must be ascertained that the current flowing therethrough does not exceed its saturation current from which the inductance behaves as a wire. For this purpose, the turning-on of switch K is conventionally conditioned by a current threshold in the inductance or in the switch.

FIG. 2 shows a conventional example of an integrated circuit 10 for controlling a PWM converter integrating an inductance protection function. It shows, integrated to this circuit, switch K (in dotted lines) between two terminals 11 and 12 of circuit 10 respectively connected to the anode of diode D (here, a Zener diode) and to ground M. To control output voltage Vout, circuit 10 also comprises a terminal 13 of connection to terminal 2 of the converter. Circuit 10 is supplied from D.C. voltage Vin filtered by a capacitor Cin, terminal 1 being connected to a terminal 14 of circuit 10.

In the example of FIG. 2, the converter is intended to supply light-emitting diodes 20 (LEDs) ensuring a screen backlighting function (for example, of a mobile phone). Circuit 10 then integrates, optionally, a second switch K' for turning on/off the load formed of diodes 20 in series. Switch K' shown in dotted lines in the form of a MOS transistor connects a terminal 15 of circuit 10 connected to load 20 to a terminal 16 of this same circuit connected to ground M, generally via a protection resistor Rp. Of course, switch K' may be external to circuit 10.

Circuit 10 comprises means not shown for measuring the current in inductance L. This current measurement is generally induced from the voltage across the inductance, measured at terminals 11 and 14 of the circuit. Another method consists of measuring (for example, by means of a shunt) the current in switch K. Circuit 10 compares the information linked to the current in inductance L with a reference value to force the turning-off of switch K in case said value is exceeded, independently from the PWM digital signal control point provided on a terminal 17.

A first family of known circuits comprises a predetermined reference, internal to circuit 10. A disadvantage of such a solution is that circuit 10 is then dedicated to an inductance L or, to stand several inductances of different values, requires setting of a minimum threshold while some inductances could stand higher currents.

A second solution consists of providing a resistor Rs connected to an additional terminal 18 of circuit 10 and to ground M to parameterize the limiting threshold of circuit 10. Such a solution enables changing resistance Rs when the value of the limiting current is desired to be modified, for example, after an inductance change. A disadvantage of this solution is that it requires a terminal (18) of additional connection of integrated circuit 10 as well as an external resistor.

FIG. 3 illustrates the variation of the maximum tolerable or standable current ($IL_{max}$) according to value L of an inductance. The curve, the exact shape of which depends on the considered inductance family (materials, conductor diameter, power dissipation capacity, etc.) shows a decrease in the maximum standable current along with the increase in the inductance value. Accordingly, when a limiting threshold is desired to be set in a circuit 10, be it internally or externally, so that it can stand several different inductances L, a relatively low threshold Imax has to be set to be able to protect all the inductances in the range. As a result, according to the inductance connected to circuit 10, its capacities are not fully exploited.

FIGS. 4A and 4B illustrate the operation of a circuit such as shown in FIG. 2 for two different inductance values L1 and L2. The left-hand portion of the timing diagrams of FIGS. 4A and 4B has been drawn for an inductance of relatively high value L1 with respect to the value of a relatively low inductance L2, the operation of which is illustrated in the right-hand portion of the timing diagrams. FIG. 4A illustrates current IL in the inductance while FIG. 4B illustrates the OFF and ON periods of switch K It should however be noted that this applies to the case of a step-up converter such as illustrated in FIG. 2, the off and on periods of the switch being inverted in the case of a step-down converter.

To enable operation with inductances L1 and L2, limiting current Imax set by circuit 10 is a function of the inductance of lower value L1. As illustrated in the right-hand portions of the timing diagrams, this results in inductance L2 having its limiting current ILmax greater than current Imax is not fully exploited. Indeed, even admitting that the duty cycle of the turn-on pulses of switch K is set in the same way as for low-value inductance L1, the limiting function is activated as soon as current I exceeds value Imax, while the control of the converter with an output voltage control point Vout would have required a longer power storage period.

The need to have an integrated circuit for controlling a converter that can accept several different inductance values is more and more frequent. Indeed, the manufacturers of integrated control circuits 10 are generally distinct from inductance manufacturers which will assemble the inductance and circuit 10 in a converter.

SUMMARY OF THE INVENTION

One embodiment of the present invention aims at improving the exploitation of the performances of an inductance while protecting it.

Another embodiment of the present invention especially aims at controlling the limiting current of a circuit for controlling an inductance with the value of said inductance.

A further embodiment of the present invention also aims at providing a solution unresponsive to possible variations of supply voltage Vin, especially when this voltage corresponds to a battery voltage.

Another embodiment of the present invention also aims at providing an integrated circuit for controlling a switch to be connected to an inductance, which has a current-limiting function therein, without requiring any external resistor for parameterizing the limiting current value.

One embodiment of the present invention provides a circuit for limiting the current in an inductance, comprising means for interrupting the power storage in the inductance at the end of a delay triggered by the current in the inductance.

According to an embodiment of the present invention, said delay is a function of the supply voltage of the inductance.

According to an embodiment of the present invention, the circuit comprises:
  means for comparing the current in the inductance with a first predetermined threshold value;
  means for triggering a delay element when said first threshold is reached; and
  means for interrupting the power storage in the inductance after a delay set by said delay element.

According to an embodiment of the present invention, said delay is proportional to the inverse of the inductance supply voltage.

According to an embodiment of the present invention, said first threshold is determined according to a family of inductances for which it is intended.

An embodiment of the present invention also provides a method for limiting the current in an inductance including interrupting the power storage in the inductance at the end of a delay triggered by the current in the inductance.

According to an embodiment of the present invention, said delay is a function of the inductance supply voltage.

According to an embodiment of the present invention, the method consists of:
  triggering a delay element upon occurrence of a current exceeding a first predetermined threshold in the inductance; and
  interrupting the power storage in the inductance at the end of a determined delay.

According to an embodiment of the present invention, the delay is proportional to the inverse of the inductance supply voltage.

An embodiment of the present invention also provides a circuit for controlling a voltage converter comprising a cut-off switch, comprising a limiting circuit.

Features and advantages of the present invention will be discussed in detail in the following non-limiting description of specific embodiments in connection with the accompanying drawings.

BRIEF DESCRIPTION OF THE DRAWINGS

FIGS. 1, 2, 3, 4A, and 4B, previously described, are intended to show the state of the art and the problem to solve;

FIG. 5 very schematically illustrates in the form of blocks a method for controlling the limiting current of an inductance according to an embodiment of the present invention;

FIG. 6 illustrates the implementation of a method according to one embodiment of the present invention on an inductance value variation;

FIG. 7 illustrates the implementation of a method according to one embodiment of the present invention on a variation of the inductance supply voltage;

DETAILED DESCRIPTION

Figure 1:
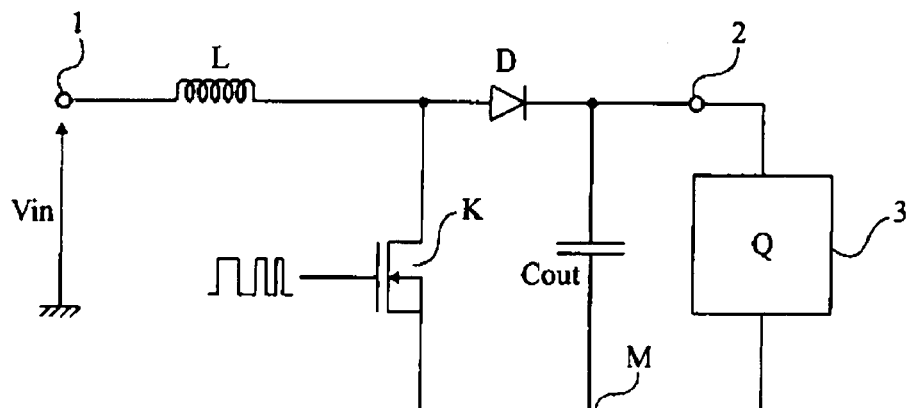

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

The same elements have been designated with the same reference numerals in the different drawings. For clarity, only those elements which are necessary to the understanding of the present invention have been shown in the drawings and will be described hereafter. In particular, the circuit for generating the control pulses of switch K with a control of the output voltage has not been detailed and is no object of the present invention, the present invention and its limiting circuit being implementable with any conventional control of the on periods of the switch.

A feature of an embodiment of the present invention is to compare the current in the inductance of a converter with a predetermined current threshold, and to trigger the delay when the current in the inductance exceeds this predetermined threshold, the limitation being then considered as being activated, at the end of the delay brought to the detection.

Another feature of embodiments of the present invention is that the delay is a function of supply voltage Vin of the inductance, more specifically, is proportional to the inverse of this voltage.

FIG. 5 very schematically shows in the form of blocks a functional embodiment of a limiting circuit according to an embodiment of the present invention. This circuit comprises a comparator 30 of current IL in the inductance (or in the switch) with respect to a threshold I0max. The result of comparator 30 is sent onto a delay element 31 ($\tau(1/V)$) having its output conditioning state ON/OFF of the switch (not shown), delay element 31 preferably receiving voltage Vin to control the value of the delay with the inverse of this voltage.

Embodiments of the present invention take advantage of the fact that the current in the inductance is a function of the ratio between the voltage which is applied thereto and the value of this inductance ($dI=(V/L)dt$). Thus, embodiments of the present invention provide generating a delay proportional to the inverse of the voltage, and stopping the current in the inductance with a delay with respect to the exceeding of a predetermined threshold. This amounts to interrupting the power storage in the inductance at the end of a delay triggered according to the current in the inductance, this delay being preferably a function of the voltage supplying the inductance.

FIG. 6 illustrates the application of a method according to one embodiment of the present invention to a variation in the inductance value. This drawing shows the shape of current IL in the inductance along time for three decreasing values L1, L2, L3.

Figure 3:
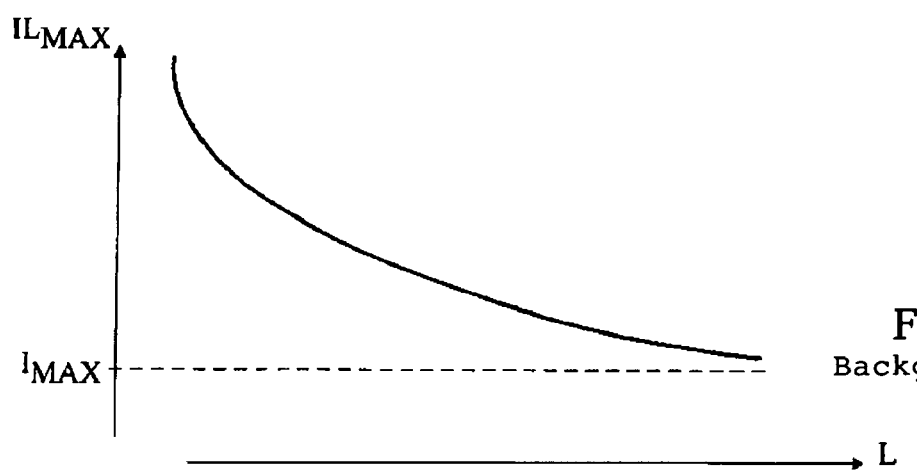

Current threshold I0max is set from a curve of the type shown in FIG. 3, determined empirically or from a sample of inductances to which the circuit must apply, and is of course chosen to be smaller than the saturation current of the inductance of maximum value that the circuit can stand.

If the current in the inductance reaches threshold I0max, this triggers the delay element setting delay τ and the switch is turned off at the end of this delay τ. In FIG. 6, voltage Vin is assumed to be constant so that delay τ applied to the different times of exceeding of value I0max is the same for the three inductance values L1, L2, L3. However, since the current slope depends on the value of this inductance (is inversely proportional to the inductance value), the application of the same delay to the different current slopes results in interrupting this current for increasing values as the inductance value decreases (IL1max, IL2max, IL3max). By selecting in adapted fashion value I0max and delay τ, the curve of the limiting current versus the inductance of the type illustrated in FIG. 3 can approximately be followed. This curve is non-linear and, as a first approximation, varies in I0max k/L, where k is a constant FIG. 7 illustrates the application of a method according to one embodiment of the present invention to an inductance of the same value but undergoing a supply voltage variation. In FIG. 7, the example of inductance value L2 has been taken for three increasing voltages V1, V2, V3. Value I0max is the same as in FIG. 6. Since the inductance has the same value, the application of the method must lead to the application of an always identical threshold IL2max. This condition is fulfilled by here varying delay τ in a way inversely proportional to the supply voltage, to obtain three respectively decreasing delays τ1, τ2, τ3 and thus ensure the compliance with threshold IL2max.

Figure 2:
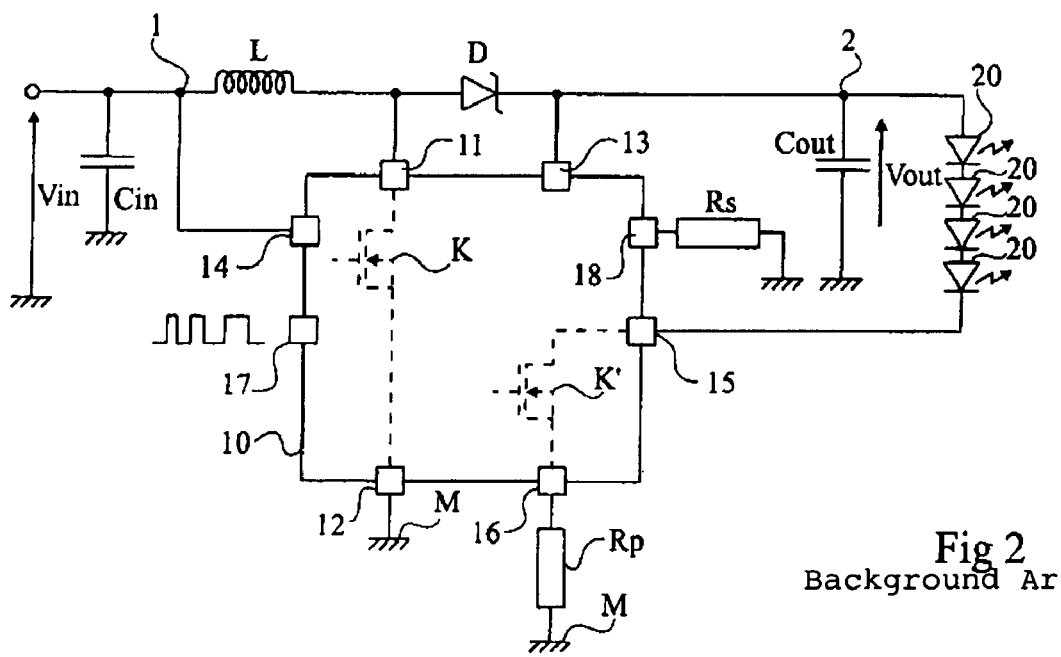
Figure 8:
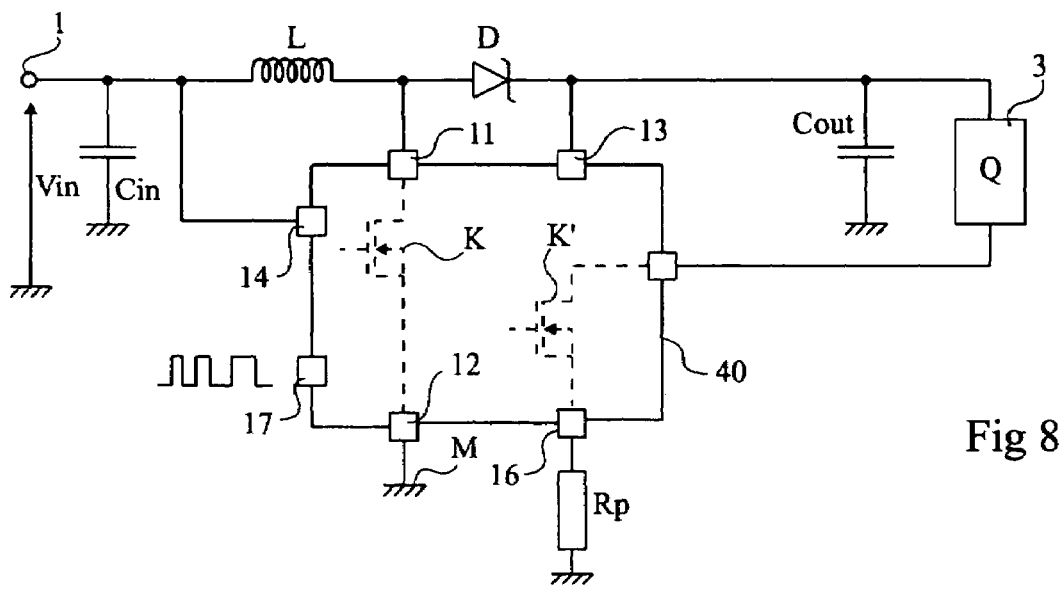
FIG. 8 shows, in a view to be compared with FIG. 2, an integrated circuit for controlling a step-up converter switch according to one embodiment of the present invention.

FIG. 8 shows, in a view to be compared with FIG. 2, a circuit 40 integrating a switch K (in dotted lines) for controlling an inductance L in a voltage step-up converter assembly. Same elements as in FIG. 2 are found, but for the notable exception of resistor Rs which, according to this embodiment of the present invention, is no longer necessary. This embodiment of the present invention thus spares an external connection terminal of integrated circuit 40 as well as an external resistor.

Figure 9:
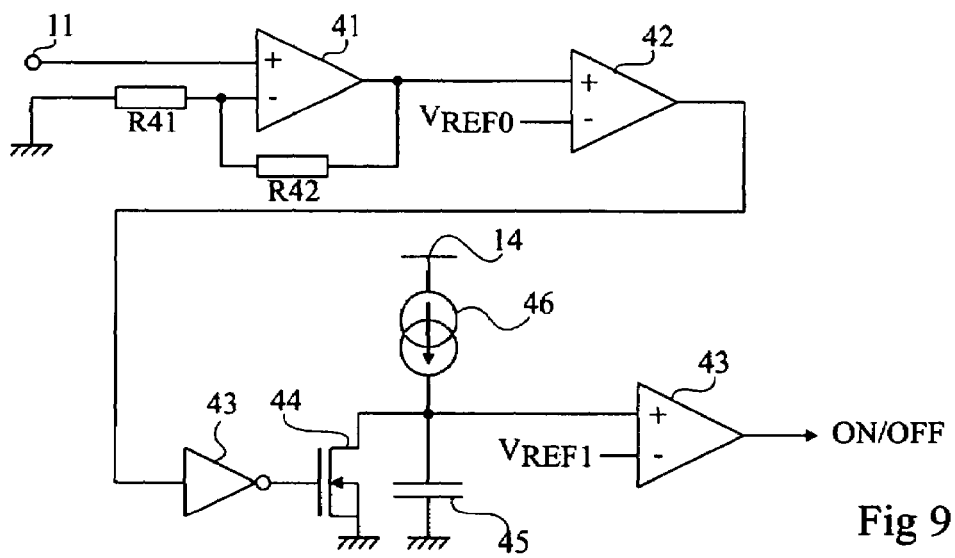
FIG. 9 shows a limiting circuit according to one embodiment of the present invention.

FIG. 9 shows an embodiment of a limiting circuit integrated to circuit 40 of FIG. 8. This circuit is intended to provide the ON/OFF signal of switch K based on the sole detection of current in inductance L. Accordingly, the circuit of FIG. 9 samples the detection information from terminals 14 and 11. The voltage information sampled from terminal 11 is compared (comparator 42) with a first predetermined voltage reference Vref0 (inverting input). Optionally, an amplifier 41 having its non-inverting input directly connected to terminal 11 and having its inverting input connected via a resistor R41 to ground may be used upstream of comparator 42. The inverting input is also looped back on the output of amplifier 41 by means of a resistor R42. Reference voltage Vref0 is set according to the desired current I0max.

The output of comparator 42 crosses an inverter 43 before driving the control electrode (for example, the gate of a MOS transistor) of a switch 44 used to short-circuit a capacitor 45 forming the delay element. Capacitor 45 is supplied by a constant current source 46 drawing its power from terminal 14, that is, directly from voltage Vin. The junction point of source 46 and of capacitor 45 is connected to the non-inverting input of a second comparator 43 having its inverting input receiving a second predetermined reference Vref1 and having its output providing the ON/OFF signal. Reference voltage Vref1 defines the variable duration of the delay of a method according to an embodiment of the present invention.

Figure 10A:
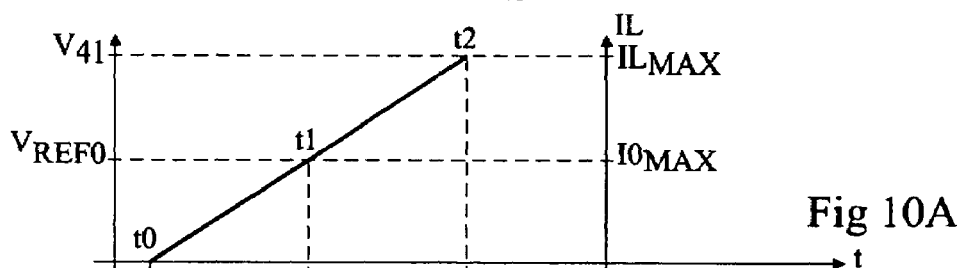
FIGS. 10A, 10B, and 10C illustrate, in timing diagrams, the operation of the circuit of FIG. 9.
Figure 10B:
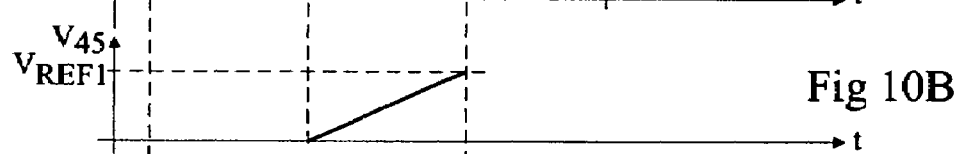
Figure 10C:
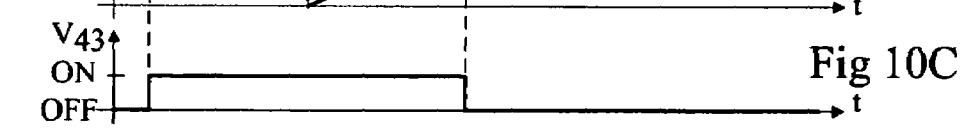

FIGS. 10A, 10B, 10C illustrate, in the form of timing diagrams, the operation of the circuit of FIG. 9. FIG. 10A shows the shape of voltage V41 at the output of amplifier 41 which forms an image of current IL in the inductance. FIG. 10B illustrates the shape of voltage V45 across capacitor 45 and FIG. 10C illustrates the shape of the output voltage of amplifier V43, that is, of the ON/OFF signal.

When the current in the inductance increases, voltage V41 increases proportionally. At a time t1 where threshold Vref0 is reached, the charge of capacitor 45 starts, after the opening of switch 44 by the switching of amplifier 42. When this charge reaches level Vref1 (time t2), the output of amplifier 43 switches, which turns off the switch K and activates the limiting function.

Of course, embodiments of the present invention are likely to have various alterations, modifications, and improvements which will readily occur to those skilled in the art. In particular, the example implementation of the circuit discussed in relation with FIG. 9 may be replaced with a circuit performing the same function, for example, using digital means.

Further, the selection of the thresholds to implement methods according to embodiments of the present invention is within the abilities of those skilled in the art based on the functional indications given hereabove and on the inductance range for which the limiting circuit is desired to be intended.

Moreover, the interrupting of the power storage in the inductance is not necessarily obtained by interrupting the battery-inductance loop as discussed in relation with a step-up converter. According to the assembly, its supply may be interrupted with a switch placed between the power source and the inductance, a free wheel operation may be forced, a discharge may be forced, etc.

Finally, although embodiments of the present invention have been more specifically described in relation with a hardware analog implementation, its implementation may use digital and/or software means.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

Embodiments of the present invention may be applied to a variety of different types of electronic circuits, such as power converters like step-up and step-down converters. These electronic circuits may, in turn, be included in a variety of different types of electronic devices and systems, such as mobile or cellular phones, computer systems, and so on.

What is claimed is:

1. A circuit for limiting the current in an inductance, the circuit receiving a supply voltage and being operable to interrupt power storage in the inductance at the end of a delay triggered by the current in the inductance, said delay being controlled as a function of a magnitude of the supply voltage applied to the inductance to limit the current in the inductance to a maximum threshold value that is independent of the magnitude of the supply voltage.

2. The circuit of claim 1, comprising:
means for comparing the current in the inductance with the maximum threshold value;
means for triggering a delay element when said maximum threshold value is reached; and
means for interrupting power storage in the inductance after a delay set by said delay element.

3. The circuit of claim 2, wherein said delay is proportional to the inverse of the supply voltage of the inductance.

4. The circuit of claim 3, wherein said maximum threshold value is determined according to a family of inductances for which it is intended.

5. A method for limiting the current in an inductance, consisting of interrupting power storage in the inductance at the end of a delay triggered by the current in the inductance, said delay being controlled as a function of a magnitude of the supply voltage of the inductance to limit the current in the inductance to a maximum threshold value, wherein the maximum threshold value does not vary in response to changes in the magnitude of the supply voltage.

6. A method for limiting the current in an inductance, consisting of interrupting power storage in the inductance at the end of a delay triggered by the current in the inductance, said delay being controlled as a function of a magnitude of the supply voltage of the inductance to limit the current in the inductance to a maximum threshold value, wherein the maximum threshold value does not vary in response to changes in the magnitude of the supply voltage, wherein the method further comprises:
triggering a delay element upon occurrence of a current exceeding the maximum threshold value in the inductance; and
interrupting power storage in the inductance at the end of a determined delay.

7. The method of claim 5, wherein the delay is proportional to the inverse of the supply voltage of the inductance.

8. A circuit for controlling a voltage converter comprising a cut-off switch, comprising a circuit for limiting the current in an inductance including means for interrupting power storage in the inductance at the end of a delay triggered by the current in the inductance, said delay being controlled as a function of a magnitude of the supply voltage applied to the inductance to limit the current in the inductance to a maximum threshold value that is independent of the magnitude of the supply voltage.

9. A protection circuit adapted to be coupled to a first node of an inductive element, the protection circuit adapted to receive a supply voltage that is also applied to a second node of the inductive element and the protection circuit operable to detect a current flowing through the inductive element and operable in response to the detected current being equal to a threshold value to interrupt power storage in the inductive element a delay time after the current is detected as being equal to the threshold value, the value of the delay time being controlled as a function of a value of the supply voltage applied to the inductive element.

10. The protection circuit of claim 9, wherein the inductive element comprises a single inductor.

11. A protection circuit adapted to be coupled to a first node of an inductive element, the protection circuit adapted to receive a supply voltage that is also applied to a second node of the inductive element and the protection circuit operable to detect a current flowing through the inductive element and operable in response to the detected current being equal to a threshold value to interrupt power storage in the inductive element a delay time after the current is detected as being equal to the threshold value, the value of the delay time being controlled as a function of a value of the supply voltage applied to the inductive element, wherein the delay time has a value that is proportional to the inverse of a magnitude of the supply voltage.

12. The protection circuit of claim 9, further comprising:
a first comparing circuit including a first input adapted to be coupled to the first node of the inductive element and a second input adapted to receive a first reference voltage, the first comparing circuit operable to generate a trigger signal responsive to a voltage on the first node being greater than the first reference voltage;
a timing circuit coupled to the first comparing circuit to receive the trigger signal and adapted to receive supply voltage applied to the second node of the inductive element, the timing circuit operable responsive to the trigger signal going active to begin charging a timing node at a rate that is a function of a value of the supply voltage and to thereby develop a timing signal on the node;
a second comparing circuit including a first input coupled to the node of the timing circuit and a second input adapted to receive a second reference voltage, the second comparing circuit operable to generate an activation signal responsive to the timing signal on the timing node being equal to the second reference voltage; and
a switching circuit adapted to be coupled to the first node of the inductive element and to the second comparing circuit, the switching circuit operable to interrupt power storage in the inductive element responsive to the activation signal going active.

13. A protection circuit adapted to be coupled to an inductance, the protection circuit receiving a supply voltage that is also applied to the inductance, the protection circuit operable to control a maximum current flowing through the inductance as a function of a value of the inductance and to interrupt the current flowing through the inductance in response to the current being equal to a maximum value, the current flowing through the inductance being terminated a delay time after the current is equal to the maximum value, wherein the delay time has a value that is being controlled as a function of a value of an input voltage applied to the inductance.

14. The protection circuit of claim 13, further comprising:
a comparing circuit adapted to be coupled to the inductance and adapted to receive a first reference voltage, the comparing circuit operable to generate a trigger signal responsive to a voltage on the inductance being greater than the first reference voltage;
a delay circuit coupled to the comparing circuit to receive the trigger signal and adapted to receive an input voltage applied to the inductance, the delay circuit operable responsive to the trigger signal going active to generate an activation signal the delay time after the trigger signal goes active, with the delay time being controlled as a function of the value of the input voltage; and
a switching circuit adapted to be coupled to the inductance and to the delay circuit, the switching circuit operable to terminate the flow of current through the inductance responsive to the activation signal going active.

15. The protection circuit of claim 13, wherein the inductance comprises a single inductor.

16. The protection circuit of claim 13, wherein the delay time has a value that is proportional to the inverse of a magnitude of the input voltage.

17. An electronic device, comprising:
an electronic circuit, including,
a protection circuit adapted to be coupled to an inductance, the protection circuit receiving a supply voltage that is also applied to the inductance and being operable to control a value of a maximum current flowing through the inductance as a function of a value of the inductance and to interrupt the current flowing through the inductance in response to the current being equal to the maximum value, the current flowing through the inductance being terminated a delay time after the current is equal to the maximum value where the delay time is being controlled as a function of a value of a supply voltage applied to the inductance.

18. The electronic device of claim 17, wherein the electronic circuit comprises one of a step-up or step-down power converter.

19. A system, comprising:
an electronic subsystem including an electronic circuit that includes,
a protection circuit adapted to be coupled to an inductance, the protection circuit receiving a supply voltage that is also applied to the inductance and being operable to control a value of a maximum current flowing through the inductance as a function of a value of the inductance and to interrupt the current flowing through the inductance in response to the current being equal to the maximum value, the current flowing through the inductance being terminated a delay time after the current is equal to the maximum value where the delay time has a value that is being controlled as a function of a value of a supply voltage applied to the inductance.

20. The system of claim 19, wherein the electronic subsystem comprises a mobile or cellular phone.

21. The system of claim 20, wherein the electronic circuit comprises one of a step-up or step-down power converter.

22. A method of controlling current flowing through an inductance, the method comprising:
controlling a maximum current flowing through the inductance as a function of a value of the inductance;
determining a delay time having a value that is being controlled as a function of a value of a supply voltage applied to the inductor; and
terminating after the delay time the current flowing through the inductance in response to the current being equal to a maximum value.

23. The method of claim 22, further comprising:
detecting the current flowing through the inductance; and
terminating the flow of current through the inductance a delay time after the current is detected as being equal to a threshold value.

24. The method of claim 23, wherein the delay time has a value that is a function of a value of an input voltage adapted to be applied to the inductance.

25. The method of claim 24, wherein the delay time has a value that is proportional to the inverse of a magnitude of the input voltage.

26. A protection circuit adapted to be coupled to first and second nodes of an inductive element, the protection circuit adapted to receive a supply voltage that is also applied to the second node of the inductive element and the protection circuit comprising:
a first comparing circuit having a first input adapted to be coupled to the first node of the inductive element and a second input adapted to receive a first reference voltage, the first comparing circuit operable to generate an active output signal responsive to a voltage on the first node being greater than the first reference voltage;
a timing circuit coupled to the first comparing circuit to receive the output signal and adapted to receive the supply voltage applied to the second node of the inductive element, the timing circuit operable responsive to the output signal going active to begin charging a timing node at a rate that is a function of a value of the magnitude of the supply voltage to develop a timing signal on the timing node;
a second comparing circuit including a first input coupled to the timing node and a second input adapted to receive a second reference voltage, the second comparing circuit operable to generate an activation signal responsive to the timing signal on the timing node being equal to the second reference voltage; and
a first switching circuit adapted to be coupled to the first node of the inductive element and to the second comparing circuit, the first switching circuit operable to interrupt power storage in the inductive element responsive to the activation signal going active.

27. A protection circuit adapted to be coupled to first and second nodes of an inductive element, the protection circuit adapted to receive a supply voltage that is also applied to the second node of the inductive element and the protection circuit comprising:
a first comparing circuit having a first input adapted to be coupled to the first node of the inductive element and a second input adapted to receive a first reference voltage, the first comparing circuit operable to generate an active output signal responsive to a voltage on the first node being greater than the first reference voltage;
a timing circuit coupled to the first comparing circuit to receive the output signal and adapted to receive the supply voltage applied to the second node of the inductive element, the timing circuit operable responsive to the output signal going active to begin charging a timing node at a rate that is a function of a value of the magnitude of the supply voltage to develop a timing signal on the timing node, and wherein the timing circuit comprises:
a constant current source coupled between a supply node adapted to receive the supply voltage and the timing node;
a delay element coupled between the timing node and a reference node adapted to receive a reference supply voltage; and
a second switching circuit having a control node coupled to the first comparing circuit and having a first signal node coupled to the timing node and a second signal node coupled to the reference node;
a second comparing circuit including a first input coupled to the timing node and a second input adapted to receive a second reference voltage, the second comparing circuit operable to generate an activation signal responsive to the timing signal on the timing node being equal to the second reference voltage; and
a first switching circuit adapted to be coupled to the first node of the inductive element and to the second comparing circuit, the first switching circuit operable to interrupt power storage in the inductive element responsive to the activation signal going active.

28. The protection circuit of claim 27, wherein the second switching circuit timing circuit further comprises an inverter having an input coupled to the first comparing circuit and an output coupled to the control node of the second switching circuit.

29. The protection circuit of claim 28, wherein the delay element comprises a capacitive element.

* * * * *